(12) United States Patent
Nakata et al.

(10) Patent No.: US 7,215,104 B2
(45) Date of Patent: May 8, 2007

(54) DC/DC CONVERTER

(75) Inventors: Kenichi Nakata, Kyoto (JP); Mikiya Doi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 33 days.

(21) Appl. No.: 10/869,867

(22) Filed: Jun. 18, 2004

(65) Prior Publication Data

US 2004/0257057 A1    Dec. 23, 2004

(30) Foreign Application Priority Data

Jun. 19, 2003    (JP) .............................. 2003-174556

(51) Int. Cl.
G05F 1/40    (2006.01)
(52) U.S. Cl. ..................... 323/282; 323/283; 315/291
(58) Field of Classification Search ................ 323/222, 323/266, 282–288, 265; 363/16–20, 25, 363/79–80, 97
See application file for complete search history.

(56) References Cited

U.S. PATENT DOCUMENTS 5,436,550 A * 7/1995 Arakawa ................... 323/222
6,246,222 B1 * 6/2001 Nilles et al. ............... 323/283
6,342,822 B1 * 1/2002 So ............................. 332/109

FOREIGN PATENT DOCUMENTS

JP    07-336999    12/1995
JP    11-332222    11/1999

* cited by examiner

Primary Examiner—Rajnikant B. Patel
(74) Attorney, Agent, or Firm—Arent Fox LLP

(57) ABSTRACT

A DC/DC converter is supplied such that the desired output setting voltage can be obtained as the load-side output, even when the difference between the power supply voltage and the output setting voltage of the load-side output is large. This DC/DC converter comprises a switching device, a voltage divider, an error amplifier, an oscillator which outputs a oscillation clock, a slope circuit which receives the oscillation clock and outputs a sawtooth waveform voltage having a slope which begins at the leading edge of the oscillation clock, a comparator which compares the sawtooth waveform voltage and the output voltage of the error amplifier, and a logic circuit which is set by the trailing edge of the oscillation clock, and is reset by the output of the comparator.

5 Claims, 3 Drawing Sheets

DC/DC CONVERTER

BACKGROUND OF THE INVENTION

1. Field of the Invention

This invention relates to a DC/DC converter which converts an input power supply voltage into a prescribed DC voltage by the turning on and off of a switching device.

2. Description of the Related Art

As one design for a DC/DC converter, a switching device is provided between a terminal to which a power supply voltage is input and a terminal to which a prescribed DC voltage is to be output, and by turning on and off (closing and opening) this switching device, the prescribed DC voltage is maintained. This design affords compactness and high efficiency, and so has come into widespread use (for example, Japanese Patent Laid-open No. 7-336999 and Japanese Patent Laid-open No. 11-332222).

A conventional DC/DC converter of this design is shown in FIG. 4. In the DC/DC converter 101, the switching device 114, which is a PMOS transistor, supplies power to the load side from a power supply (VCC), and under prescribed control, that is, by closing and opening the switching device according to the output from a comparator 110 described below, maintains the load-side output ($V_{OUT}$) at an output setting voltage. A smoothing circuit 115 comprising a coil, capacitor and diode is connected to the switching device 114, to smooth the voltage from the switching device 114. The load-side output ($V_{OUT}$) is voltage-divided by a voltage divider 116 comprising series resistances, and is input to the inversion input terminal of an error amplifier 111. The error amplifier 111 amplifies and outputs the error between the voltage of an error comparison reference power supply 118 and the voltage input to the inversion input terminal. The output voltage ($V_{FB}$) of the error amplifier 111 is input to the comparator 110. In the comparator 110, the output voltage ($V_{FB}$) of the error amplifier 111 and a triangular waveform voltage ($V_S$) are compared, and the output voltage ($V_C$) passes through a buffer 119 and is input to the gate of the above-mentioned switching device 114. In this way, the switching device 114 is controlled by a feedback circuit from the load-side output ($V_{OUT}$).

In the comparator 110, the triangular waveform voltage ($V_S$) compared with the output voltage ($V_{FB}$) of the error amplifier 111 is generated and output by a triangular waveform generator circuit (TRI).

If the output voltage ($V_{FB}$) of the error amplifier 111 is higher than the triangular waveform voltage ($V_S$), then a low level voltage is output from the comparator 110 and passes through the buffer 119, and a low level voltage is input to the gate of the switching device 114. As a result, the switching device 114 is closed (turned on).

Conversely, if the output voltage ($V_{FB}$) of the error amplifier 111 is lower than the triangular waveform voltage ($V_S$), then a high level voltage is output from the comparator 110 and passes through the buffer 119, and a high level voltage is input to the gate of the switching device 114. As a result, the switching device 114 is opened (turned off).

SUMMARY OF THE INVENTION

In this way, in the above DC/DC converter 101 the output voltage ($V_{FB}$) of the error amplifier 111 and the triangular waveform voltage ($V_S$) are compared by the comparator 110. In this DC/DC converter 101, when the difference between the power supply voltage (VCC) and the output setting voltage of the load-side output ($V_{OUT}$) is large, that is, when the output setting voltage is set to an extremely low voltage compared with the power supply voltage (VCC), there is an output voltage ($V_{FB}$) of the error amplifier 111 near the turning point of the triangular waveform voltage ($V_S$), and these are compared by the comparator 110. In FIG. 5, ΔV is the voltage difference from the output voltage ($V_{FB}$) of the error amplifier 111 to the turning point of the triangular waveform voltage ($V_S$), and Δt is the interval over which the triangular waveform voltage ($V_S$) exceeds the output voltage ($V_{FB}$) of the error amplifier 111. The frequency of the triangular waveform voltage ($V_S$) is between approximately 1 MHz and 2 MHz, and the amplitude is set between approximately 0.5 V and 1.0 V.

If, for example, the power supply voltage (VCC) is 20 V and the output setting voltage is to be set to 1.2 V, the voltage difference ΔV is from 30 mV to 60 mV approximately, and the interval Δt is from 30 nS to 60 nS approximately. Hence with the conditions that the voltage difference ΔV is 30 mV and the interval Δt is 30 nS, for a 5 V output, the comparator is required to have a bandwidth and gain of 33 MHz and 44 dB respectively.

However, although such a high-performance comparator may conceivably be realizable as a single product adopting the most advanced processes, the price would be extremely high. Moreover, when integrated with other component portions as a semiconductor integrated circuit, in addition to the high costs of the semiconductor integrated circuit, problems would be posed by the consumption current, occurrence of noise, manufacturing processes and similar. Hence for practical purposes it is thought to be impossible to realize a DC/DC converter comprising such a comparator.

On the other hand, if an ordinary comparator is used under the above conditions, because of the comparator delay pulses are not output and the desired output setting voltage cannot be obtained for the load-side output ($V_{OUT}$). That is, the pulse output of an ordinary comparator is thought to be limited to approximately 100 nS, and output of pulses shorter than this is not possible.

An object of this invention is to provide a DC/DC converter for which a desired output setting voltage can be obtained for the load-side output ($V_{OUT}$), even when there is a large difference between the power supply voltage (VCC) and the output setting voltage of the load-side output ($V_{OUT}$).

In order to attain the above object, a DC/DC converter of this invention comprises: a switching device which, by closing and opening, supplies power from a power supply-side to a load side and maintains the load side at an output setting voltage; an error amplifier which amplifies the difference between the voltage from the load side and an error comparison reference voltage and outputs an output voltage; an oscillator which outputs a oscillation clock; a slope circuit which outputs, in synchronization with the oscillation clock, a sawtooth waveform voltage having a slope beginning before the trailing edge of the oscillation clock (for instance, a slope beginning from the leading edge of the oscillation clock); a comparator which compares the sawtooth waveform voltage of the slope circuit with the output voltage of the error amplifier; and a logic circuit which is set by the trailing edge of the oscillation clock and reset by the comparator output signal, and the above switching device closes and opens according to the output pulse signal of the above logic circuit.

By means of this DC/DC converter, even when the difference between the power supply voltage (VCC) and the output setting voltage of the load-side output ($V_{OUT}$) is large, the desired output setting voltage can be obtained regardless of the comparator delay time.

Further, if in this DC/DC converter the above logic circuit is reset by the leading edge of the above oscillation clock as well, the DC/DC converter can operate reliably even when the output voltage of the error amplifier undergoes large transient changes.

DESCRIPTION OF THE PREFERRED EMBODIMENTS

Figure 1:
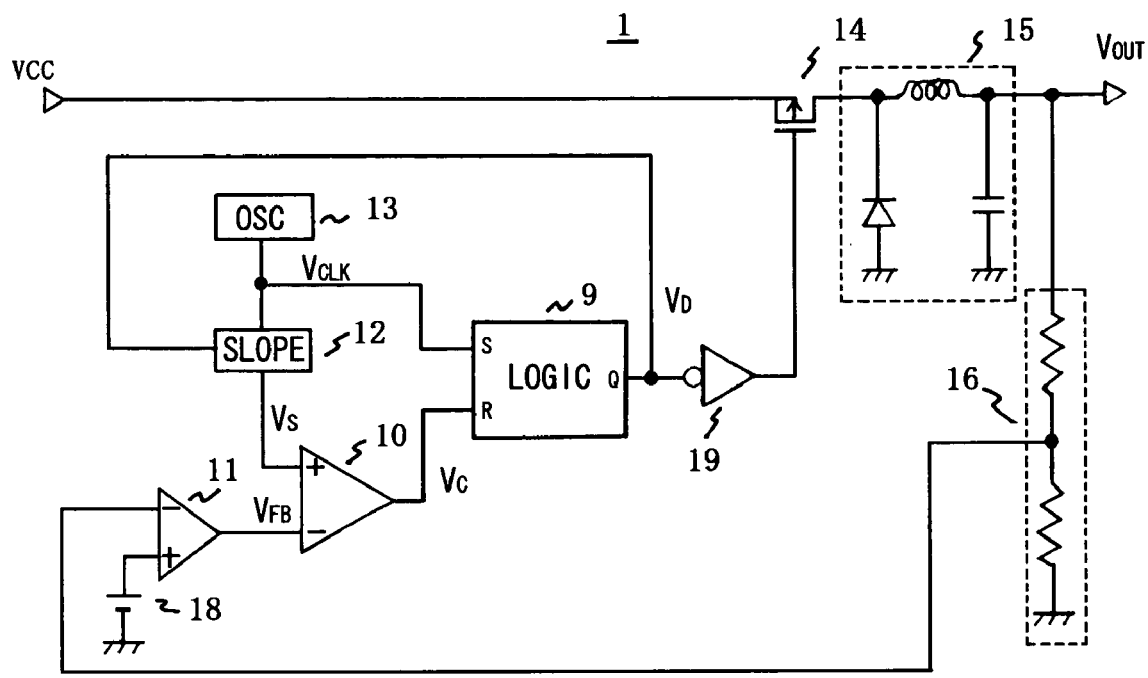
FIG. 1 is a circuit diagram of the DC/DC converter according to an embodiment of the present invention.

Below, embodiments of the present invention are explained, referring to the drawings. FIG. 1 is a circuit diagram of the DC/DC converter of an embodiment of the present invention. Portions of the component elements of this DC/DC converter 1 are effectively the same as in the conventional DC/DC converter explained above, but the circuit configuration from the output of the comparator 10 to the gate of the switching device 14, the oscillator circuit (OSC) 13, and slope circuit (SLOPE) 12 are particularly different.

In the DC/DC converter 1, the switching device 14 is a PMOS type transistor which supplies power from the power supply side (VCC) to the load side, and which maintains the load-side output ($V_{OUT}$) at the output setting voltage through prescribed control, that is, by closing and opening according to the output of the logic circuit 9 described below. A smoothing circuit 15 comprising a coil, capacitor and diode is connected to the switching device 14, and smoothes the voltage from the switching device 14. The voltage divider 16 comprises series resistances, is connected to the load side, that is, to the stage following the smoothing circuit 15, and divides the load-side voltage, that is, the voltage smoothed by the smoothing circuit 15; this voltage is then input to the inversion input terminal of the error amplifier 11 described below.

The error amplifier 11 amplifies the difference between the error comparison reference voltage input to the non-inversion input terminal from the error comparison reference voltage source 18 and the voltage input to the inversion input terminal, and outputs the result to the inversion input terminal of the comparator 10, described below, as the output voltage ($V_{FB}$). The comparator 10 compares the sawtooth waveform voltage ($V_S$) input to the non-inversion input terminal from the slope circuit (SLOPE) 12, described below, and the output voltage ($V_{FB}$) of the error amplifier 11, and outputs the result to the reset input terminal R of the next-stage logic circuit (LOGIC) 9. The logic circuit 9 inputs, at the set input terminal S, the oscillation clock ($V_{CLK}$) from the oscillator (OSC) 13, and outputs, from the output terminal Q, the output pulse signal ($V_D$) to the slope circuit 12 and to the gate of the above-described switching device 14 via the inversion buffer 19. In this way, the switching device 14 is controlled by a feedback circuit using the load-side output ($V_{OUT}$).

The sawtooth waveform voltage ($V_S$) input to the non-inversion input terminal of the above-described comparator 10 is generated as follows. The sawtooth waveform voltage ($V_S$) is generated in the slope circuit 12 in synchronization with the oscillation clock ($V_{CLK}$) from the oscillator (OSC) 13, and is a triangular waveform voltage with one edge sloping asymmetrically. More specifically, as shown in FIG. 3, the slope circuit 12 generates a voltage (slope voltage) which slopes in synchronization with the leading edge of the oscillation clock ($V_{CLK}$), and returns to the original constant voltage in synchronization with the trailing edge of the output pulse signal ($V_D$) of the logic circuit 9 described below, and repeats this behavior.

Here the oscillator (OSC) 13 is set to an oscillation clock ($V_{CLK}$) frequency of approximately 2 MHz (period 500 nS), and the pulse width (high level width) is set to approximately 100 nS, so that the duty factor is low.

Figure 2:
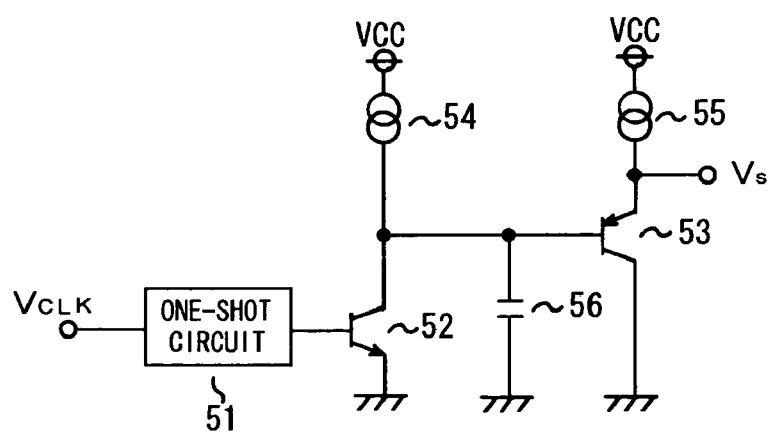
FIG. 2 is a circuit diagram showing a configuration of the generator of slope voltage thereof.

The generator of a slope voltage in the slope circuit 12 is configured as in FIG. 2. That is, this generator comprises a one-shot circuit 51 which receives the oscillation clock ($V_{CLK}$) and generates a one-shot pulse synchronized with the leading edge of the oscillation clock; an NPN transistor 52 which is turned on only during the interval of a one-shot pulse; a constant current source 54 connected to the output of the NPN transistor 52; a capacitor 56; a PNP transistor 53, the base of which is connected to the output of the transistor 52, and from the emitter of which a slope voltage is output; and a constant current source 55 connected to the PNP transistor 53. This generator is a simple example of generation of a slope voltage, and a detailed explanation of the operation is omitted; but a circuit with a different configuration may be used to obtain similar functions.

Figure 3:
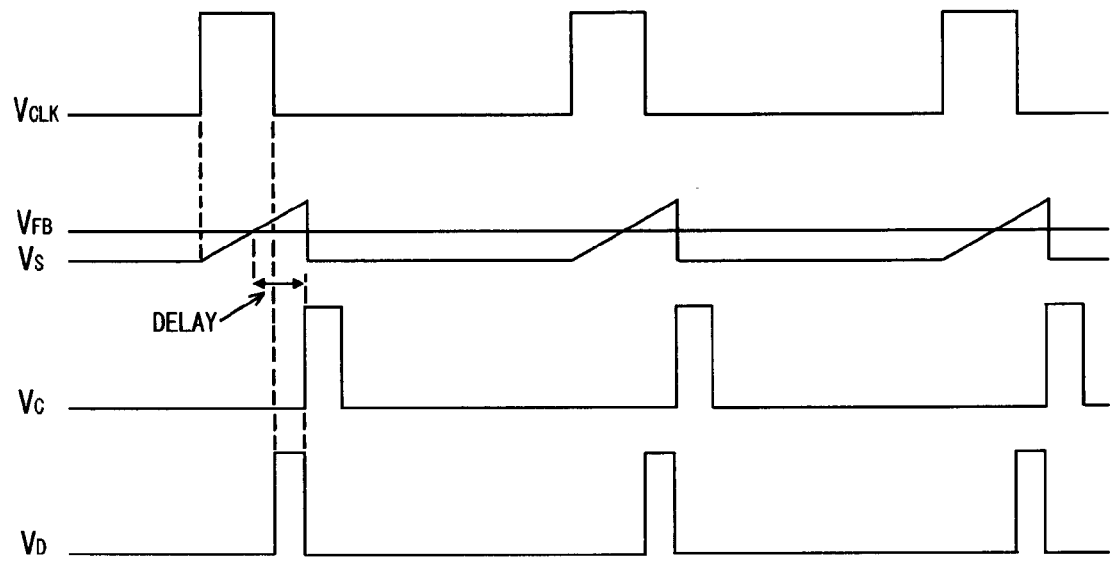
FIG. 3 is a waveform diagram thereof.
Figure 4:
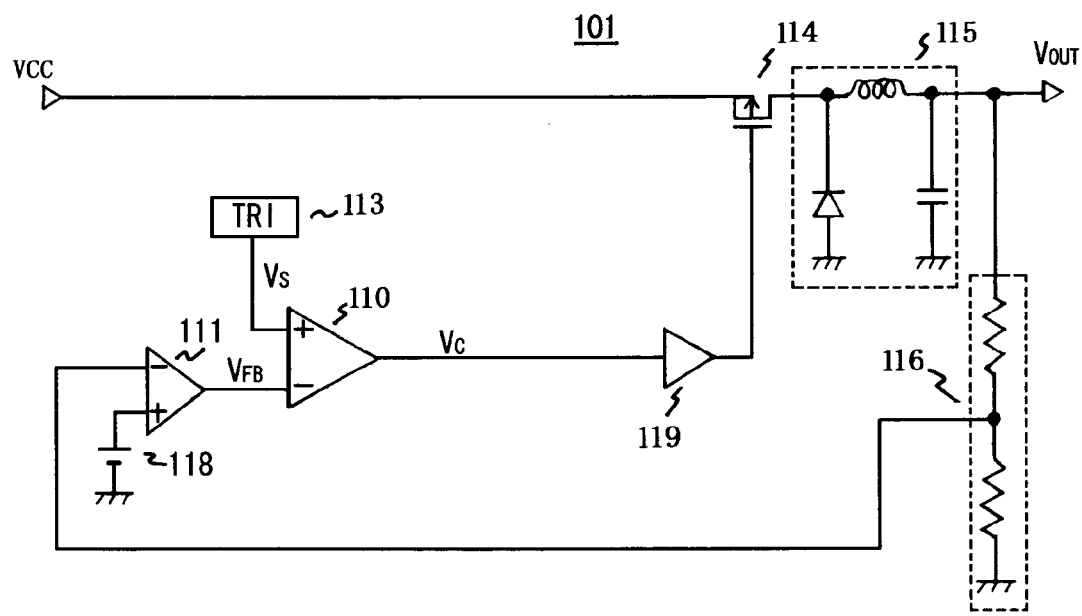
FIG. 4 is a circuit diagram of a DC/DC converter according to a prior art.
Figure 5:
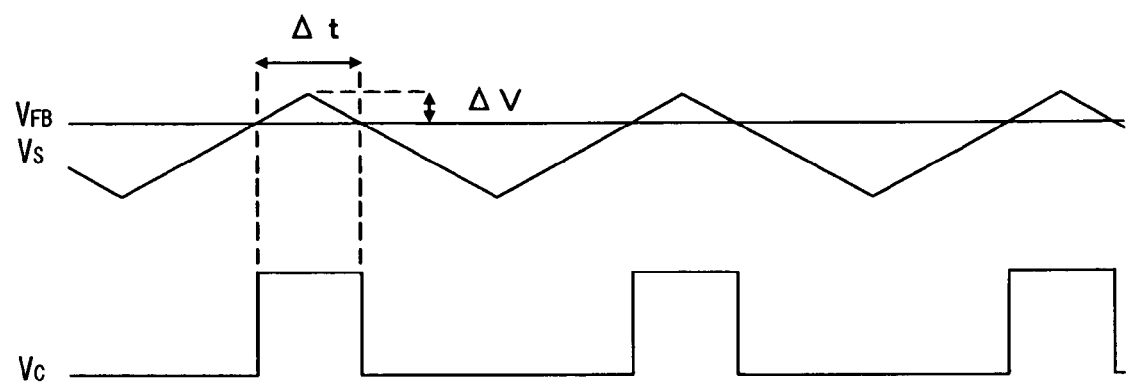
FIG. 5 is a waveform diagram thereof.

As a result of input of the output signal ($V_C$) of the comparator 10 to the reset input terminal R and of the oscillation clock ($V_{CLK}$) of the oscillator 13 to the set input terminal S, the above-described logic circuit 9 is set by the trailing edge of the oscillation clock ($V_{CLK}$) and is reset by the output signal ($V_C$), to output the output pulse signal ($V_D$), as shown in FIG. 3.

Next, specific operation is explained, focusing on the comparator 10 and logic circuit 9.

In the state in which the sawtooth waveform voltage ($V_S$) is lower than the output voltage ($V_{FB}$) of the error amplifier 11, the output signal ($V_C$) of the comparator 10 is at low level, but when the sawtooth waveform voltage ($V_S$) becomes higher than the output voltage ($V_{FB}$) of the error amplifier 11, the output signal ($V_C$) of the comparator 10 changes to high level. Here, similarly to the explanation of the example of the prior art, a constant delay occurs from the time at which the sawtooth waveform voltage ($V_S$) becomes higher than the output voltage ($V_{FB}$) of the error amplifier 11, until the output signal ($V_C$) of the comparator 10 changes to high level. This delay time depends on the circuit configuration, manufacturing process and similar of the comparator 10, but in this embodiment is approximately 50 nS. Due to this delayed output signal ($V_C$), the output pulse signal ($V_D$) of the logic circuit 9, already in the set state, is reset. By this means, the switching device 14 changes from the on state to the off state, and the sawtooth waveform voltage ($V_S$) of the slope circuit (SLOPE) 12 returns to the original constant voltage.

When the output setting voltage is extremely low compared with the power supply voltage (VCC), after beginning to rise the sawtooth waveform voltage ($V_S$) reaches the output voltage ($V_{FB}$) of the error amplifier 11 comparatively quickly. As stated above, the delay time of the comparator 10 is approximately 50 nS, and the pulse width of the oscillation clock ($V_{CLK}$) is approximately 100 nS, so that there is the possibility that the reset input may be input before the set input in the logic circuit 9. In this case, the output pulse signal ($V_D$) is not output, but because feedback is applied from the load-side output ($V_{OUT}$), the output voltage ($V_{FB}$) of the error amplifier 11 rises. And, in the logic circuit 9 the reset input is delayed, and the reset input is input after the set input. In this way an output pulse signal ($V_D$) is output from the logic circuit 9, and the load-side output ($V_{OUT}$) is maintained at the prescribed low output setting voltage.

Hence even when the power supply voltage (VCC) is 20 V and the output setting voltage is to be set to 1.2 V, an output pulse signal ($V_D$) with short width is output from the logic circuit 9, and the load-side output ($V_{OUT}$) is maintained at 1.2 V.

Conversely, when the output setting voltage is set to a comparatively high value (when the output setting voltage is set to close to the power supply voltage (VCC)), the output voltage ($V_{FB}$) of the error amplifier 11 rises, and the sawtooth waveform voltage ($V_S$) rises together with this. As a result, the width of the output pulse signal ($V_D$) output by the logic circuit 9 is increased, the turn-on interval of the switching device 14 is lengthened, and the load-side output ($V_{OUT}$) is maintained at the prescribed high output setting voltage.

In a modified example of this embodiment, the pulse width of the oscillation clock ($V_{CLK}$) can also be altered. That is, as explained above, the delay time of the comparator 10 changes according to the circuit configuration, manufacturing processes and similar, and the pulse width of the oscillation clock ($V_{CLK}$) is changed together with this delay time. However, if the pulse width of the oscillation clock ($V_{CLK}$) is small compared with the delay time of the comparator 10, a minimum fixed interval occurs between the set input and reset input in the logic circuit 9. As a result, the voltage extremely low compared with the power supply voltage (vcc) cannot be the output setting voltage. If, on the other hand, the pulse width of the oscillation clock ($V_{CLK}$) is large, because the logic circuit 9 does not output an output pulse signal ($V_D$) during the interval of this pulse width, the upper limit to the width of the output pulse signal ($V_D$) is reduced, and the load-side output ($V_{OUT}$) cannot be set to a high output setting voltage. Hence the pulse width of the oscillation clock ($V_{CLK}$) must be set taking these matters into consideration.

As a further modified example of this embodiment, when there is the set input of the pulse of the oscillation clock ($V_{CLK}$) from the oscillator 13 and moreover there is the input of the next pulse, the logic circuit 9 of this embodiment may be forcibly reset at the leading edge of the latter pulse. By this means, even when there is no reset input of the output signal ($V_C$) of the comparator 10, the sawtooth waveform voltage ($V_S$) of the slope circuit 12 can be raised to the original constant voltage. This enables accommodation of cases which may occur in which, under transient circumstances such as changes in the power supply voltage (VCC), the output voltage ($V_{FB}$) of the error amplifier 11 is too high and there is no reset input of the output signal ($V_C$) of the comparator 10 to the logic circuit 9.

The switching device 14 in this embodiment is a PMOS transistor, but this may be replaced with an NMOS transistor, in which case the buffer 19 should be a non-inversion buffer.

If the sawtooth waveform voltage ($V_S$) of the slope circuit 12 is such that after reset of the logic circuit 9 the slope voltage is returned as quickly as possible to the original constant voltage, then the applicable range of the output setting voltage can be broadened; but an appropriate gradient should be chosen when returning to the original constant voltage, according to noise levels, the circuit configuration and similar.

The case of a step-down DC/DC converter was explained in this embodiment; but by changing the configurations and connections of the switching device 14, smoothing circuit and similar, a step-up DC/DC converter can be constructed.

The DC/DC converters according to the embodiments of the present invention were described above, but the present invention is not limited to these embodiments, and design thereof can be changed in various ways within the scope of the matters stated in the Claims.

What is claimed is:

1. A DC/DC converter, comprising:
   a switching device which, by closing and opening, supplies power from a power-supply side to a load side, and maintains the load side at an output setting voltage;
   an error amplifier which amplifies the error between the voltage from the load side and an error comparison reference voltage, and outputs an output voltage;
   an oscillator which outputs a oscillation clock having a pulse width of a low duty factor from a leading edge to a trailing edge;
   a slope circuit which outputs, in synchronization with the oscillation clock, a sawtooth waveform voltage having a slope beginning before the trailing edge of the oscillation clock;
   a comparator which compares the sawtooth waveform voltage of the slope circuit with the output voltage of the error amplifier; and,
   a logic circuit which is set by the trailing edge of the oscillation clock and reset by the comparator output signal with a delay time,
   wherein said switching device closes and opens according to the output pulse signal from said logic circuit.

2. The DC/DC converter according to claim 1, wherein said slope of the sawtooth waveform voltage begins from the leading edge of the oscillation clock.

3. The DC/DC converter according to claim 1, wherein said logic circuit is also reset by the leading edge of said oscillation clock.

4. The DC/DC converter according to claim 1, further comprising a smoothing circuit connected to the switching device.

5. The DC/DC converter according to claim 1, wherein upon reset of the logic circuit, the sawtooth waveform voltage is returned to an original constant voltage.

* * * * *